United States Patent Office 3,557,124
Patented Jan. 19, 1971

3,557,124
PROCESS FOR THE MANUFACTURE OF
2,6-DICHLOROPYRIDINE
Robert R. Stringham and Florence E. Torba, Concord, Calif., assignors to The Dow Chemical Company, Midland, Mich., a corporation of Delaware
No Drawing. Filed Mar. 22, 1968, Ser. No. 715,148
Int. Cl. C07d 31/26
U.S. Cl. 260—290                                9 Claims

ABSTRACT OF THE DISCLOSURE

The process for the manufacture of 2,6-dichloropyridine which comprises contacting chlorine with a 2-chloropyridine composition. 2,6-dichloropyridine is useful as a fungicide and as an intermediate for the production of 3,5,6-trichloro-2-pyridinol.

BACKGROUND OF THE INVENTION 2,6-dichloropyridine is prepared in known methods by the vapor phase chlorination of pyridine. However, such processes are characterized by low yields and the production of by-products such as more highly chlorinated materials and tarry residues. The latter make the separation of the desired 2,6-dichloropyridine extremely difficult. Furthermore, the known methods result in yields of 2,6-dichloropyridine of only about 35 percent based upon the pyridine employed in its preparation.

2,6-dichloropyridine is a colorless liquid melting at about 85°–87° C. and boiling at about 170° C. at atmospheric pressure. The product is useful as a fungicide for the control of such fungal organisms as tomato late blight. It is also useful as an intermediate for the production of 3,5,6-trichloro-2-pyridinol, which latter compound is particularly adapted for use in the production of O,O-dialkyl-O-3,5,6-trichloro-2 - pyridyl phosphates and thiophosphates. The latter phosphates and thiophosphates are of outstanding value as parasiticides for the control of many insect, mite and bacterial pests. In such operations, 2,6-dichloropyridine is hydrolyzed with sodium hydroxide to prepare a 6-chloro-2-pyridinol which may readily be chlorinated to obtain good yields of 3,5,6-trichloro-2-pyridinol. Phosphorylation of the 3,5,6-trichloro-2-pyridinol in conventional procedures with O,O-diethyl phosphorochloridate or phosphorochloridothioate gives the desired triester phosphate or thiophosphate. Accordingly, it is believed evident that an improved method for the manufacturer of 2,6-dichloropyridine is desirable.

It is an object of the present invention to provide a new and improved process for the production of 2,6-dichloropyridine. It is also a further object to provide a method which is more economical than known methods and give yields of 2,6-dichloropyridine far in excess of those previously obtained. An additional object is the provision of a process which does not produce large quantities of other chlorinated pyridines such as the trichloropyridines which are difficult to separate from the desired 2,6-dichloropyridine product. Another object is the provision of an improved method which may be carried out in a continuous manner for the manufacture of 2,6-dichloropyridine. Other objects will be apparent from the following specification and claims.

SUMMARY OF THE INVENTION

The present invention is directed to a process which comprises contacting chlorine with a 2 - chloropyridine composition to effect the selective chlorination of 2-chloropyridine to 2,6-dichloropyridine. The chlorination conveniently may be carried out directly in liquid 2-chloropyridine or in an inert organic liquid as reaction medium. Suitable media are those in which the 2-chloropyridine is soluble or readily dispersible and which are poor solvents for hydrogen chloride. Such media, liquid at the reaction temperature, include hexachlorobutadiene, pentachloropyridine, dichlorobenzenes, 1,2,3 - trichlorobenzene, 1,2,4 - trichlorobenzene, carbon tetrachloride and 1,3,5-trichlorobenzene. The chlorination and contacting is carried out at temperatures at which hydrogen chloride is formed and evolved as a product of reaction and preferably under substantially anhydrous conditions. Where optimum yields are desired, the contacting and chlorination is carried out while exposing the reaction zone to actinic radiation. Following the reaction period, the reaction mixture can be employed as a fungicide or as an intermediate as previously described, or the 2,6-dichloropyridine product may be separated and isolated from the reaction mixture in conventional procedures. Conveniently, the reaction mixture can be neutralized with aqueous alkali metal hydroxide and thereafter fractionally distilled to separate the 2,6-dichloropyridine product. As an alternative to distillation, the neutralized mixture may be cooled and the 2,6-dichloropyridine separated by filtration as a crystalline solid. The reaction takes place smoothly under these conditions with the production of the 2,6-dichloropyridine product in yields of up to 95 percent or more based upon the 2-chloropyridine charged to the reaction. Further, the new process is characterized as being capable of being carried out continuously to give reaction products comprising only minor amounts of higher chlorinated pyridine products.

To obtain the very desirable yields in accordance with the present teaching, it is critical and essential that the reaction be carried out at a temperature at which hydrogen chloride is formed. Good results are obtained when operating at temperatures of from about 90° C. up to the boiling temperature of 2-chloropyridine. The reaction may be carried out at temperatures in excess of the boiling temperature and up to 180° C. under slightly elevated or autogenous pressure to maintain the 2-chloropyridine in the liquid state. Temperatures in excess of 180° C., however, should not be employed for any appreciable period of time as they give substantially and materially lower yields of 2,6-dichloropyridine. In a preferred embodiment, the contacting and chlorination is carried out at a temperature of from about 130° C. to about 150° C.

Although the reaction and production of 2,6-dichloropyridine takes place in the absence of actinic radiation, efficient operation at temperatures below 145° C. usually requires that chlorination be carried out while exposing the reaction mixture to actinic light. Irradiation of the reaction mixture with light sources having substantial wave lengths of from 2000 to 5000 angstroms, and preferably from about 2500 to 3500 angstroms are suitable. At temperatures of about 145° C. and higher, the reaction is usefully fast under diffuse visible light. At temperatures of about 160° C. and above, the reaction also proceeds at a practicable rate in the absence of light.

The rate at which the formation of the 2,6-dichloropyridine takes place depends upon the presence or absence of actinic light and has been found to vary directly with the employed temperature, the longer periods being employed at the lower temperatures. In general, chlorine is introduced and contacted with the 2-chloropyridine at a rate at which it provides agitation in the reaction zone. Alternatively, it may be supplied at a rate at which it is substantially all absorbed and consumed in the reaction zone. Maximum conversions of starting materials are obtained in periods of from one to ten hours.

The desirable results of the present invention are obtained when the chlorination is carried out with any substantial amount of chlorine. However, it is usually preferred from the standpoint of economy to use enough chlorine to obtain the maximum conversion of 2-chloropyridine. The reaction consumes about one molecular proportion of chlorine for each molecular proportion of 2-chloropyridine. Thus, one molecular proportion of 2-chloropyridine is employed with at least 0.75 and usually with at least one molecular proportion of chlorine. In a preferred procedure, the chlorine is employed in an amount in excess of that consumed in the reaction mixture, the excess serving to stir the reaction mixture and to sweep out hydrogen chloride of reaction. The use of a large excess of chlorine does not have an adverse effect upon the reaction but is generally undesirable from the standpoint of economy.

In carrying out the reaction, gaseous chlorine is introduced portionwise into liquid 2-chloropyridine or a dispersion of 2-chloropyridine in an organic liquid reaction medium. The addition is carried out with an amount of chlorine at least sufficient to provide for the consumption of about one molecular proportion of chlorine by each molecular proportion of 2-chloropyridine. The addition is accomplished with stirring and at a temperature at which hydrogen chloride is evolved and ordinarily at a temperature of from 90° to 170° C. The introduction can be carried out at such a rate as to provide for the agitation of the reaction mixture.

It is preferred that the 2-chloropyridine reactant employed in accordance with the present method is one which contains minimal amounts of hydrogen chloride or 2-chloropyridine hydrochloride. Such a starting material provides for the minimization of the formation of undesired by-products, that is, chlorination products other than 2,6-dichloropyridine. Thus, it is desirable to avoid contacting of the 2-chloropyridine reactant with hydrogen chloride prior to contacting it with chlorine and the preferred mode of operation is the direct chlorination of 2-chloropyridine as the free base. However, it has been found that 2-chloropyridine compositions can be employed which comprise up to 30 mole percent of 2-chloropyridine hydrochloride. In such embodiment, it is critical and essential that the 2-chloropyridine composition contain not in excess of 30 mole percent of 2-chloropyridine hydrochloride. Amounts of 2-chloropyridine hydrochloride in excess of 30 mole percent should not be employed as they materially reduce the yields of the desired 2,6-dichloropyridine product. In preferred operations, the 2-chloropyridine composition to be employed as a starting material should not contain in excess of about 10 mole percent of 2-chloropyridine hydrochloride. Thus, in an alternative mode of operation, one molecular proportion of a 2-chloropyridine composition containing not in excess of 30 mole percent of 2-chloropyridine hydrochloride may be employed with one or more molecular proportions of chlorine. Upon completion of the contacting and chlorination, the reaction mixture is neutralized to remove any hydrogen chloride present. The neutralized mixture is then treated as previously described to recover any unreacted 2-chloropyridine and to separate the desired 2,6-dichloropyridine. The reaction is conveniently carried out in a reaction vessel resistant to corrosion by chlorine and hydrogen chloride. Glass or silica vessels or vessels lined with glass or silica are suitable.

A particularly valuable and preferred mode of operation comprises carrying out the foregoing process as a continuous process. Thus, the reactants are introduced or metered into a reaction zone with the temperature of the zone being maintained between about 90° and about 180° C., and preferably at about 120°–170° C. The reaction is carried out at a throughput rate and in a reaction mixture volume such as to provide for a residence time of at least about ¼ hour, or preferably, sufficient to effect a substantial conversion of the 2-chloropyridine at the temperature employed. The contacting of the reactants is preferably carried out under actinic light when the lower temperatures are employed. Good results are obtained at residence times of from ½ to 5 hours at temperatures of about 145°–155° C. The introduction is carried out in a mole ratio of one molecular proportion of employed 2-chloropyridine with about one or more molecular proportions of chlorine. From the standpoint of economy, it is usually preferred to collect unabsorbed chlorine and recycle such halogen through the reaction zone.

When carrying out the continuous process as described above, a product containing 2,6-dichloropyridine is continuously or intermittently withdrawn from the reaction zone at a rate commensurate with the rate of introduction of 2-chloropyridine thereto. The withdrawn product is then neutralized with alkali metal hydroxide, washed with water and thereafter fractionally distilled to separate the desired 2-6-dichloropyridine product. The contact time of the reaction can be varied, resulting in varying percentage of conversion of the 2-chloropyridine to 2,6-dichloropyridine. However, unreacted 2-chloropyridine can be separated by distillation from the crude product and recycled for further chlorination.

Conventional reactors, such as tubular or columnar reactors, can be employed and the reaction can be carried out in co-current or countercurrent fashion. However, for optimal yields it is preferred to design the reactor so that the input of 2-chloropyridine while still below chlorination temperature does not encounter effluent gases containing hydrogen chloride which might thereby form undesirable amounts of 2-chloropyridine hydrochloride in said input.

DESCRIPTION OF SOME PREFERRED EMBODIMENTS

The following examples illustrate the present invention but are not to be construed as limiting the same.

EXAMPLE 1

Gaseous chlorine is introduced portionwise into a 2-chloropyridine product (25 grams; 0.2 mole 2-chloropyridine) containing 1 percent dichloropyridines. The introduction is carried out at the rate of 0.67 mole of chlorine per hour and over a period of 8½ hours. During the contacting of the reagents, the reaction mixture is maintained at a temperature of 110° C. and exposed to actinic radiation having wave lengths of 2500 to 3500 angstroms as provided by an ultraviolet lamp. At periods of 3, 6.5 and 8½ hours, samples of the reaction mixture are withdrawn and analyzed by vapor phase chromatography for yield of 2,6-dichloropyridine based upon the 2-chloropyridine starting product. The analyses show yields of 2,6-dichloropyridine of 72.3, 90.6 and 94.3 percent, respectively, based upon the 2-chloropyridine employed in the reaction mixture.

EXAMPLE 2

A further operation is carried out exactly as described in the preceding example save that the introduction of chlorine is carried out over a period of three hours and at a temperature of 150°–155° C. At the end of 1, 2 and 3 hours, samples are withdrawn from the reaction mixture and analyzed by vapor phase chromatography. The analyses show yields of 2,6-dichloropyridine of 95.3, 95.5 and 92.3 percent, respectively, based upon the amount of the 2-chloropyridine employed.

EXAMPLE 3

Gaseous chlorine is introduced continuously into 56.78 grams (0.5 mole) of 2-chloropyridine. The introduction of the chlorine is carried out over a period of fifteen hours and at a rate of 0.145 mole per hour. During the introduction, the reaction mixture is maintained at a temperature of 95° C., and irradiated with actinic radiation having wave lengths of 2400 to 3600 angstroms from an ultraviolet light. Following the reaction period, analyses of the reaction product establish that the 2,6-dichloropyridine is obtained in a yield of about 70 percent based upon the employed 2-chloropyridine.

EXAMPLE 4

Gaseous chlorine is introduced into a mixture consisting of 57 grams (0.5 mole) of 2-chloropyridine and 125 grams of pentachloropyridine. The introduction is carried out over a period of two hours and at a rate of 2 moles per hour. During the introduction, the reaction mixture is maintained at a temperature of from 165° to 170° C. and irradiated with actinic radiation having wave lengths of 2400 to 3800 angstroms from an ultraviolet light. Following the reaction, the reaction mixture is fractionally distilled under reduced pressure to separate 2,6-dichloropyridine in a yield of 76 percent based upon the employed 2-chloropyridine.

EXAMPLE 5

A reactor is charged with 800 milliliters of 2-chloropyridine and gaseous chlorine introduced therein portionwise at the rate of about 9.6 moles per hour. The contacting and introduction is carried out at a temperature of 140° C. and the reaction mixture is intensely stirred and irradiated with an ultraviolet lamp giving off actinic rays in the range of from 2200 to 4000 angstroms. After two hours, the reaction mixture is sampled and found to contain about 90 mole percent of 2,6-dichloropyridine. The introduction of chlorine is thereafter continued at the same rate together with the continuous introduction of 2-chloropyridine at the bottom of the reactor at the rate of about 400 milliliters per hour. During this continuous operation, the reaction mixture is withdrawn from the top of the reactor at a rate substantially equivalent to the rate of introduction of the 2-chloropyridine. After 2 hours of continuous operation, the liquid reactor effluent is analyzed and found to contain about 86 percent by weight of 2,6-dichloropyridine.

EXAMPLE 6

A composition of 0.9 gram-mole of 2-chloropyridine and 0.1 gram-mole of 2-chloropyridine hydrochloride with 200 milliliters of hexachlorobutadiene is chlorinated exactly as described in Example 4. Following the reaction, the 2,6-dichloropyridine product is separated in a yield of 0.7 gram-mole.

What is claimed is:

1. A process for the manufacture of 2,6-dichloropyridine which comprises contacting 2-chloropyridine as the free base in a liquid 2-chloropyridine composition with at least about 0.75 molecular proportions of chlorine per molecular proportion of said free base and at a temperature of from 90° to 180° C., said composition comprising not more than about 0.3 molecular proportions of hydrogen chloride per molecular proportion of 2-chloropyridine contained therein.

2. The process of claim 1 wherein said composition consists essentially of 2-chloropyridine.

3. The process of claim 1 wherein said composition comprises not more than 0.1 molecular proportion of hydrogen chloride per molecular proportion of 2-chloropyridine contained therein and said contacting is done at a temperature of from 130° to 170° C.

4. The process of claim 1 when carried out while subjecting the reaction mixture to actinic radiation having a wavelength of from 2000 to 5000 angstroms.

5. The process of claim 1 wherein said liquid 2-chloropyridine composition consists essentially of 2-chloropyridine dispersed in an inert organic liquid which is a poor solvent for hydrogen chloride.

6. A continuous process for the production of 2,6-dichloropyridine which comprises:
   (a) continuously metering chlorine and liquid 2-chloropyridine as the free base into a reaction zone maintained at a temperature of from 90° to 180° C. and in a ratio of at least one mole of chlorine per mole of 2-chloropyridine,
   (b) contacting said chlorine and 2-chloropyridine in said zone at said temperature for at least fifteen minutes, thereby forming a liquid reaction mixture comprising 2,6-dichloropyridine, and
   (c) continuously withdrawing said reaction mixture from said zone at a volume rate essentially equal to that at which it is formed.

7. The process of claim 6 wherein said contacting is carried out under substantially anhydrous conditions.

8. The process of claim 6 wherein the contacting is carried out while subjecting the reaction mixture to actinic radiation having a wavelength of from 2000 to 5000 angstroms.

9. The process of claim 6 when carried out at a temperature of from 120 to 170° C.

References Cited

UNITED STATES PATENTS 3,426,035   1969   Bremmer   260—290

HENRY R. JILES, Primary Examiner

H. I. MONTZ, Assistant Examiner